United States Patent [19]

Carlock et al.

[11] 4,243,358

[45] Jan. 6, 1981

[54] CONTROL SYSTEM FOR REDUNDANT SWASHPLATE DRIVE

[75] Inventors: Gaylord W. Carlock, Joshua; William L. McKeown; James R. Goodman, both of Euless; Chester Skrodzki, Watauga, all of Tex.

[73] Assignee: Textron, Providence, R.I.

[21] Appl. No.: 950,456

[22] Filed: Oct. 11, 1978

[51] Int. Cl.³ .............................................. B64C 27/72
[52] U.S. Cl. ..................................... 416/114; 416/31; 416/162
[58] Field of Search ............... 416/114, 115, 162, 47, 416/31; 244/17.13, 17.25, 17.27

[56] References Cited

U.S. PATENT DOCUMENTS

| 2,755,870 | 7/1956 | Gerstenberger | 416/114 |
|---|---|---|---|
| 2,919,081 | 12/1959 | Schön | 244/17.13 |
| 2,957,527 | 10/1960 | Gerstenberger | 416/114 |
| 2,978,038 | 4/1961 | Doman et al. | 416/114 |
| 3,199,601 | 8/1965 | Dean et al. | 416/114 X |
| 3,256,780 | 6/1966 | Riley et al. | 416/114 X |
| 3,570,786 | 3/1971 | Lewis | 416/115 X |
| 3,625,632 | 12/1971 | Casterline | 416/114 X |
| 3,767,323 | 10/1973 | Zech | 416/114 X |
| 3,790,108 | 2/1974 | Bock | 74/469 X |

FOREIGN PATENT DOCUMENTS 995459  12/1951  France ............................ 416/115

OTHER PUBLICATIONS

Flight International; (6-3-78); p. 1697.

*Primary Examiner*—Everette A. Powell, Jr.
*Attorney, Agent, or Firm*—Richards, Harris & Medlock

[57] ABSTRACT

A helicopter mast is driven by a transmission with a swashplate individually linked to pitch horns on each rotor blade. At least four actuators are coupled to the swashplate, three of which normally control the attitude and position of the swashplate. A separate power unit is provided for each actuator, each power unit being independently driven from the transmission. Means are then provided to shift control of the swashplate from one of the three actuators to a fourth actuator upon any one becoming disabled.

12 Claims, 11 Drawing Figures

CONTROL SYSTEM FOR REDUNDANT SWASHPLATE DRIVE

TECHNICAL FIELD

This invention relates to the control of a helicopter, and more particularly to the control of redundant channels leading to a swashplate.

BACKGROUND ART

Helicopters generally have utilized mechanical linkages leading from a pilot control stick to actuator inputs for controlling the location and attitude of a swashplate. The swashplate is then coupled to pitch horns on rotor blades to control cyclic pitch and collective pitch. Variations in cyclic pitch are produced by tilting the swashplate. Variations in collective pitch are produced by raising and lowering the swashplate. The position and attitude of a swashplate may be controlled by three actuators connected to three points on the swashplate. Electrical sensors have been utilized to sense pilot inputs for producing control signals in a servo system which in turn drives swashplate actuators.

Military aircraft are vulnerable to damage by enemy fire. Because of such exposure, military specifications for a control system require continued operability, even though a given control channel fails, is damaged or otherwise is placed out of action.

Any three actuators may determine the plane and position of the swashplate. More than three actuators may provide for operating redundancy. In such case, the failure of mechanical hardware as upon ballistic impact can be tolerated to a degree depending upon the extent of redundancy.

DISCLOSURE OF THE INVENTION

In accordance with the present invention, control is provided for more than three hydraulic actuator units coupled to the swashplate where each actuator is provided with hydraulic power and electrical power separate and apart from the sources for any other actuator to permit redundancy, independent one channel from the other, except for failure logic. Each channel is isolated from every other channel. All of the actuator units may share the loads on the swashplate. The actuators are sized so that any number down to three can accommodate the loads.

More particularly, the present invention applies where helicopter rotor blades are controlled by more than three channels connected to a swashplate. Hydraulic actuators are linked between each control point and a transmission. An electrical generator is driven directly by the transmission during rotation of the rotor. A hydraulic pump is driven directly by the transmission during rotation of the rotor. Hydraulic channels lead from the pump to the actuator and electrical channels lead from the generator. Separate control channels lead from the pilot control to each actuator causing the actuators to apply forces to the swashplate in response to control signals. In accordance with the invention, three active actuators control the swashplate in response to static loads with provision to responding to failure logic to substitute a new actuator should one of the three active actuators become disabled. All actuators are operative to bear variable swashplate loads.

The invention provides for the control of more than three channels leading to a swashplate and for allocation of loads between them.

BRIEF DESCRIPTION OF THE DRAWINGS

A more complete understanding of the invention and its advantages will be apparent from the following detailed description taken in conjunction with the accompanying drawings in which.

DETAILED DESCRIPTION

FIG. 1

Figure 1:
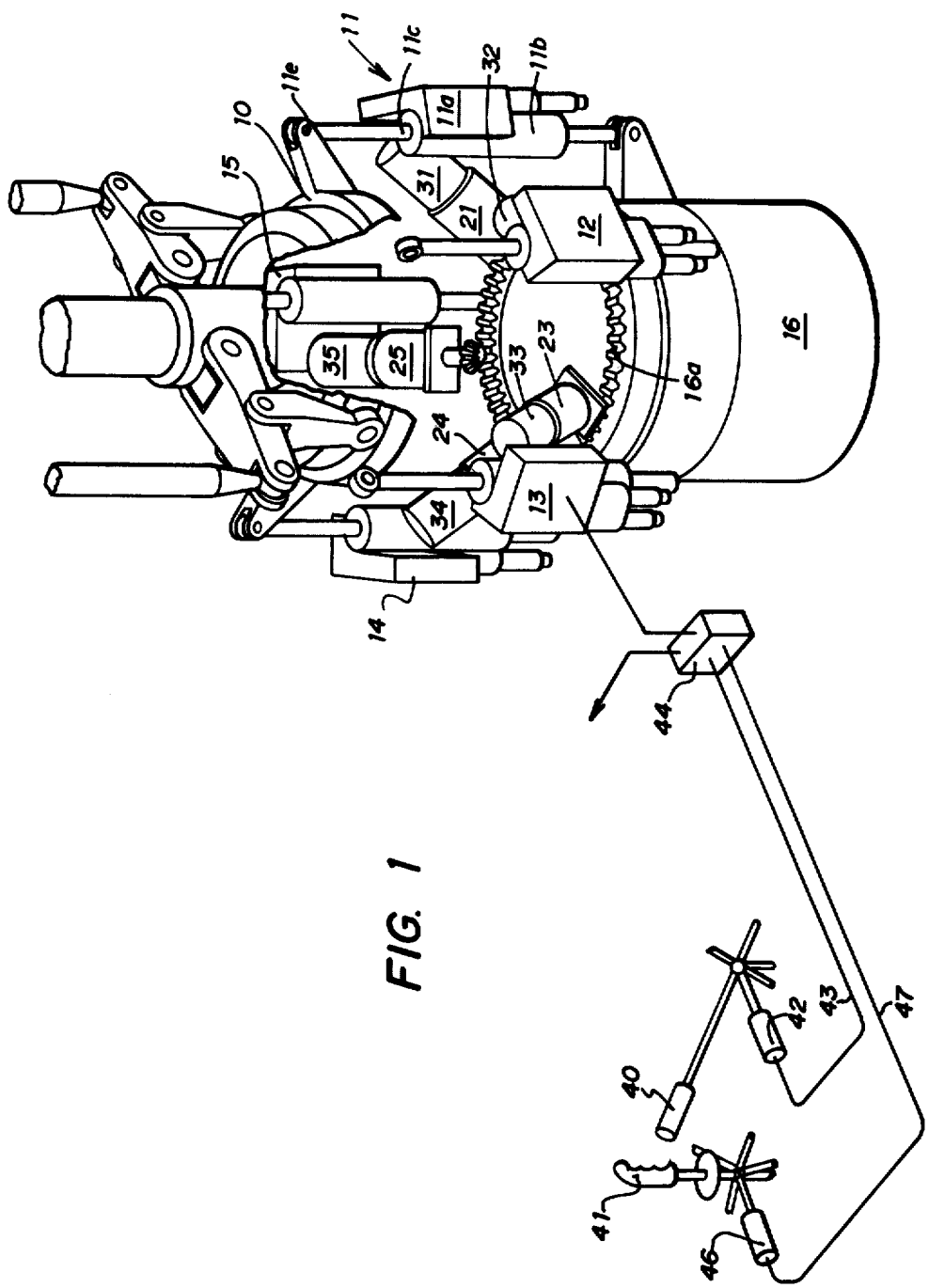
FIG. 1 illustrates one embodiment of a system employing the present invention.
Figure 2:
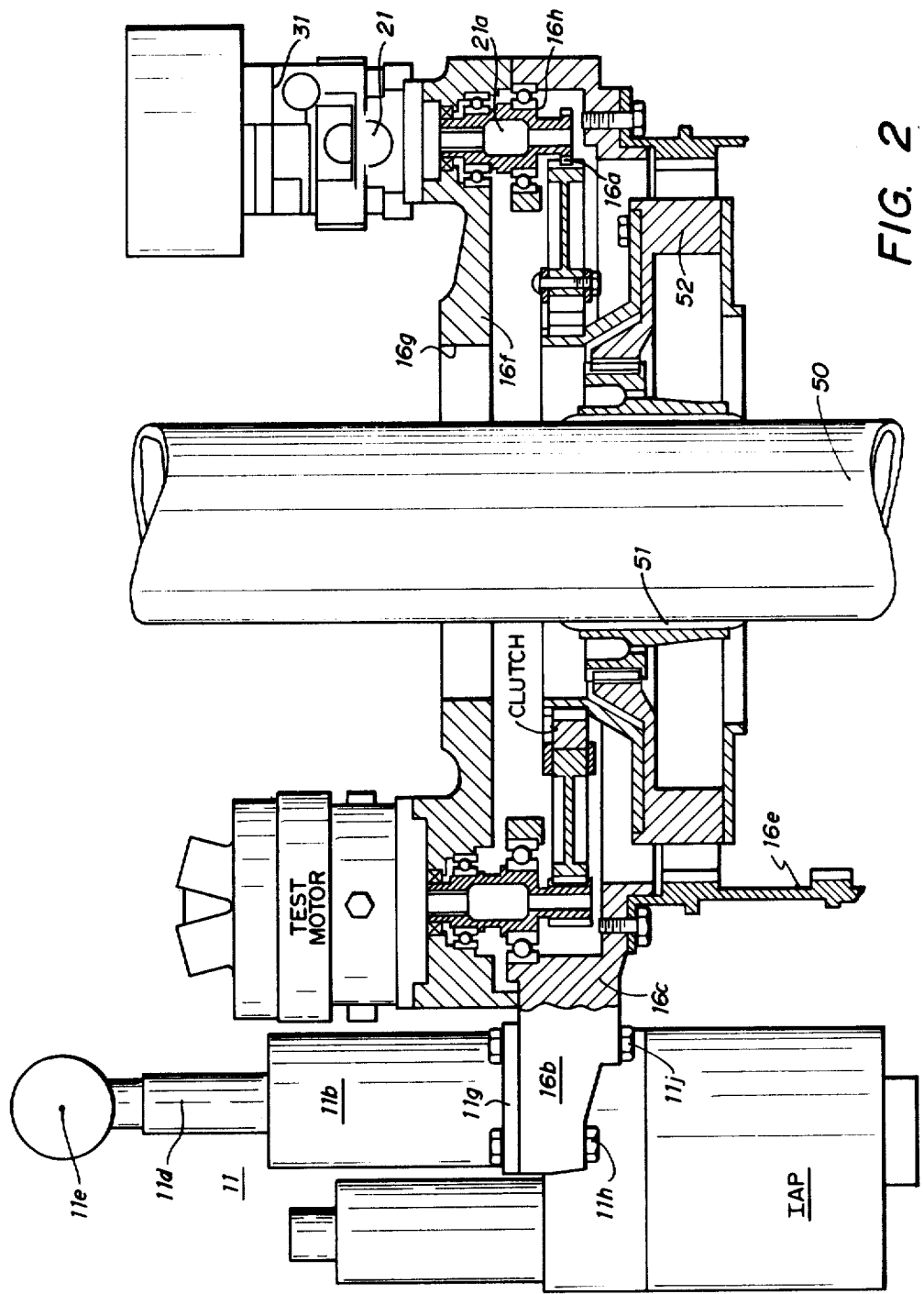
FIG. 2 is a sectional view through a transmission showing a power arrangement for an actuator.
Figure 3:
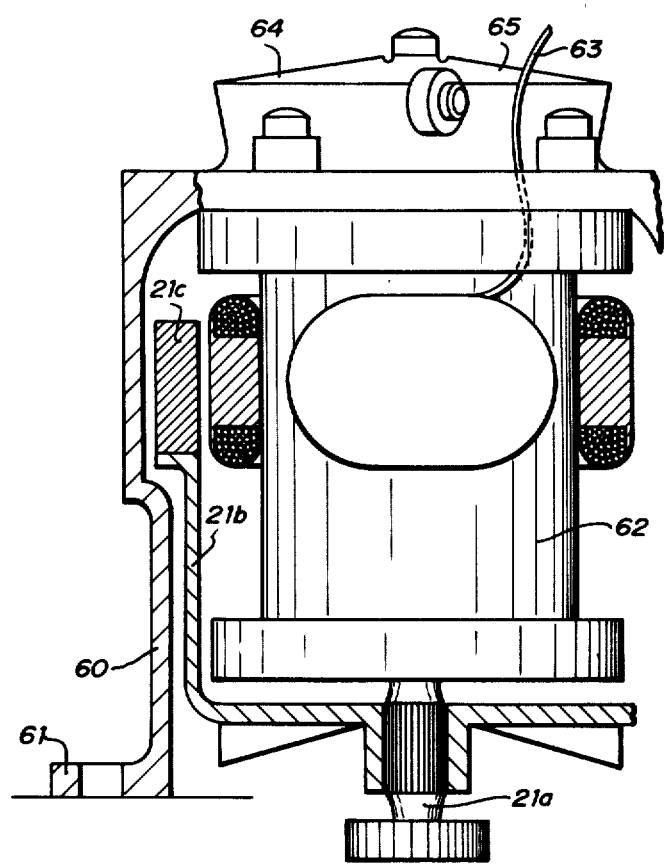
FIG. 3 illustrates an embodiment of an integrated power supply for an actuator.

FIGS. 1, 2 and 3 illustrate the present invention.

A swashplate 10 is controlled as to attitude and position by three or more of five electrohydraulic actuators 11-15. The actuators 11-15 are physically secured to a main transmission 16. In the form shown the actuators 11-15 are arrayed at uniform spacing around the periphery of the main transmission. As will later be shown in more detail, actuator 11 is mounted on transmission 16 and includes a set of control valves mounted in housing 11a and a hydraulic actuating cylinder 11b. A piston rod 11c extends by way of linkage 11d to a pivot poiht 11e on the swashplate 10. Each of the actuators 11-15 is so coupled.

The transmission 16 is provided with a driving gear 16a which rotates with and is coupled to the mast (not shown) which is driven by transmission 16.

Each of the actuators 11-15 is provided with a separate electrical power source and a separate hydraulic power source. More particularly, actuator 11 is provided with an electrical generator 21 and a hydraulic pump 31. Similarly, actuator 12 is provided with an electrical generator (not shown) and a hydraulic pump 32. Actuator 13 is provided with an electrical generator 23 and a hydraulic pump 33. Actuator 14 is provided with an electrical generator 24 and a pump 34. Actuator 15 is provided with electrical generator 25 and a pump 35. Each of the power packages comprising an electrical generator and a hydraulic pump is driven by a direct coupling to the gear 16a in the transmission 16. Thus, each actuator has a separate electrical power source and a hydraulic power source. The actuators are controlled by pilot input derived from the collective stick 40 and the cyclic stick 41. One channel has been shown extending from each of the collective and cyclic sticks. More particularly, a sensor 42 is responsive to commands introduced by way of the collective stick 40. Preferably sensor 42 is an optical sensor to provide on a fiber-optic channel 43 a collective command to a control module 44, which in response to collective commands actuates actuator 13. Four other collective sensors (not shown) provide an identical command to the other four actuators.

In contrast, a sensor 46 is utilized as one of five such sensors (four not being shown) associated with the cyclic stick 41. The sensor 46 feeds signals by way of fiber-optic links 47 to the module 44. The sensors, such as sensor 46, are geometrically arranged relative to cyclic stick 41 at points corresponding to the positions of the actuators 11–15 so that positionally the swashplate is actuated as indicated by a given movement of cyclic stick 41.

In general, the control of the actuators in response to collective and cyclic pitch commands comprises the present invention as will be described. It is to be understood that the present invention involves redundancy in control of actuators to the swashplate 10 and utilizes the separate supply for each actuator. The actuator channels are independent of one another except for failure logic which may be used to link them and control interplay as between them.

Each input point on swashplate 10 is controlled by a complete independent channel. Each channel begins at the cyclic and collective sticks where there is a sensor for each channel. The position command signals are transmitted from the sensors to electronics modules (one of which is shown as module 44) by the fiber-optic links. The optical signal is transmitted preferably as a digital signal to the electronics modules where it is converted into an electrical analog signal. Each electronics module then controls one actuator which is a part of an integrated actuator package. The actuator is referred to as an integrated actuator package because it is a complete hydraulic system, except for the pump, in one package. Each package is powered electrically and hydraulically by a dedicated electrohydraulic power supply. Each power supply is driven by a separate pad on the main rotor transmission. The power supply includes the generator which is sandwiched between the hydraulic pump and the transmission drive pad. Each channel is thus complete from signal generation and transmission to power generation to control output.

FIG. 2

FIG. 2 is a fragmentary partially sectional view of the transmission 16 onto which the actuators, generators and hydraulic pumps are mounted. In this view, actuator 11 is provided with a mounting flange 11g which is secured by 11h and 11j to a bracket 16b of the transmission 16.

The transmission housing member 16c, of which the bracket 16b forms a part, is secured as by bolts 16d to a housing member 16e. Support of member 16c is a mounting plate 16f, through which there extends an opening 16g. The mast 50 extends through opening 16g and is supported by bearings and is driven by drive means not shown, but coupled through the mast through splines 51. The driving mechanism for the mast 50 includes the drive ring 52 from which there is supported the ring gear 16a. The electrical generator 21 and the hydraulic pump 31 are mounted on plate 16f with the output shaft 21a being driven by a coaxial shaft 16h which is journaled in a set of bearings mounted in housing 16c and coupled in a driving relation to the gear 16a. The gear 16a is thus coupled to and rotates with the mast 50 so that whenever the mast 50 is rotating electrical power is available from generator 21 and hydraulic power is available from pump 31. Through connections, conventional but not shown, power from generator 21 and hydraulic fluid from pump 31 is applied to the actuator 11.

FIG. 3

FIG. 3 illustrates one embodiment of an integrated electrical generator and hydraulic pump. A housing 60 is provided, including a flange 61 for mounting the integrated unit onto member 16c in FIG. 2. The system includes the input shaft 21a to which there is splined a rotating cup 21b. The cup has a rim including a plurality of magnets 21c, preferably formed of materials such as samarium-colbalt. A central housing 62 is supported within cup 60 and comprises a piston type hydraulic pump, generally of construction well known, but in this case fitted within the cup 21d. On the periphery of housing 62 are mounted a plurality of stationary armature winding from which there extends output conductors 63. Output ports 64 and 65 lead from the housing 62 so that an integrated pump and generator are provided for use in the system shown in FIG. 2.

FIG. 4

Figure 4:
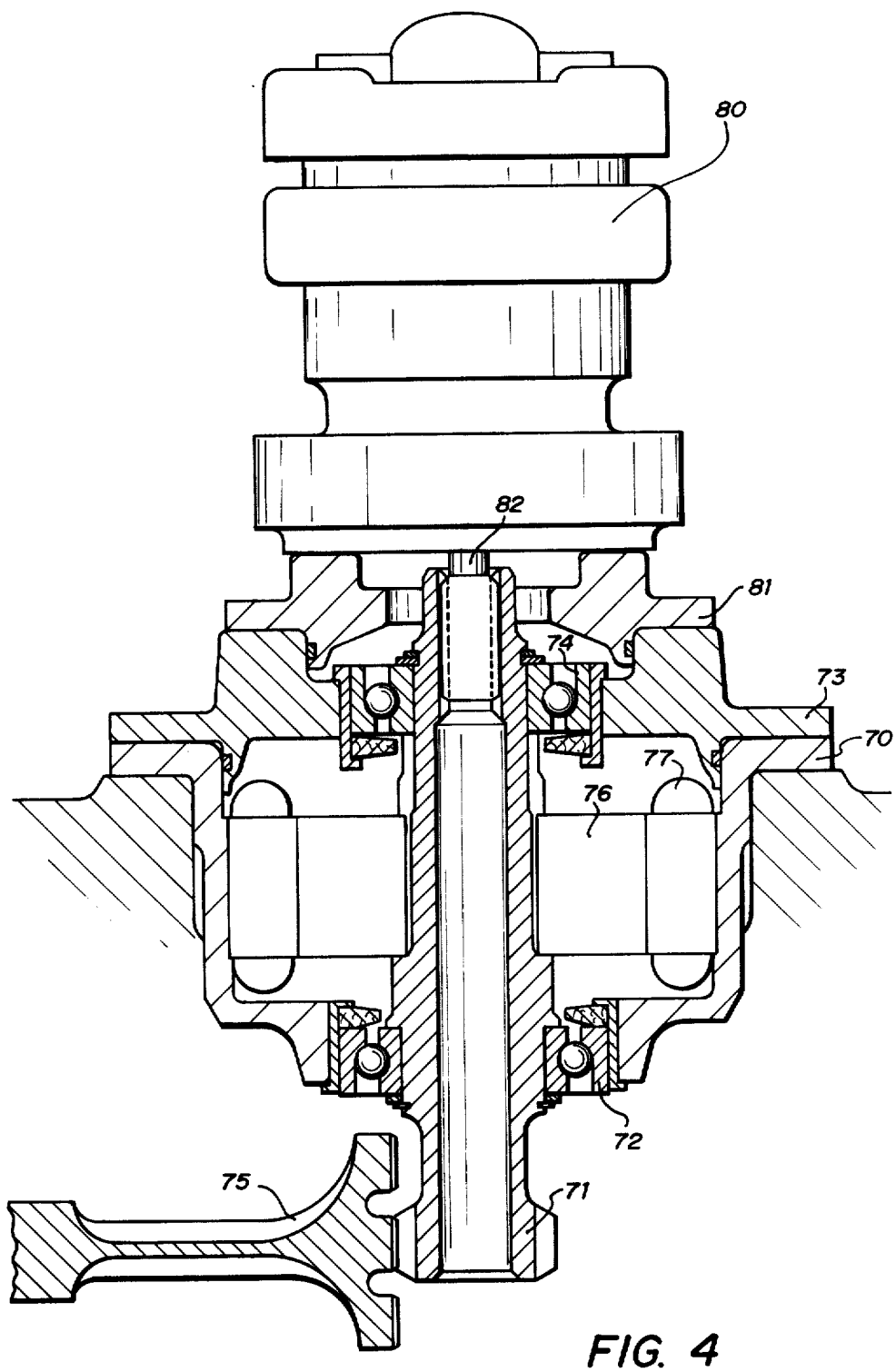
FIG. 4 illustrates an alternative form of integrated power supply.

FIG. 4 shows a modification of the integrated pump electrical generator. In this form the generator comprises a pump mounting pad 70 of cup shape within and through which there extends a hollow shaft 71. Shaft 71 is journaled in bearing 72 in the lower end or bottom of cup 70. Cup 70 is closed at the top by a mounting ring 73 which includes bearing 74 which journals the upper end of the hollow shaft 71. The lower end of the shaft 71 is provided with gear teeth which mesh with teeth on a gear 75 which may correspond with the ring gear 16a of FIGS. 1 and 2. Intermediate the length of the shaft 71 are mounted a plurality of samarium-cobalt magnets 76. Alternator windings 77 are mounted on the inner surface of the cup 70 so that as the shaft 71 carrying magnets 76 rotates, electrical power is generated in the winding 77.

A hydraulic pump 80 is mounted on the ring 73 as by suitable bolts (not shown) extending through a mounting bracket 81. The shaft 82 of pump 80 is splined to the upper end of the shaft 71.

It will be apparent that different specific forms of integrated power supplies can be employed. It is to be understood, however, that in any case there will be provided at least four integrated actuator systems, each with its own individual and separate integrated power supply.

One problem associated with connecting multiple actuators to a common load is in getting them to share the load equally, instead of engaging in a force fight due to permissible tolerances in the control loops associated with each of the actuators. Such a contest among the actuators is undesirable for two reasons. The first reason is that it degrades the servo performance. The second reason is that it will create more severe fatigue environments for the actuators, mechanisms and structural members. In order to minimize any contest between the three active and any nonactive on-line channels, the invention involves utilizing primarily only three actuators at any one time with any other on-line actuators being force output limited by employing a differential pressure feedback on the redundant actuators.

There are two different types of loads on a helicopter swashplate:

(1) an average or mean load; and (2) superimposed on the mean load are oscillatory loads.

Figure 9:
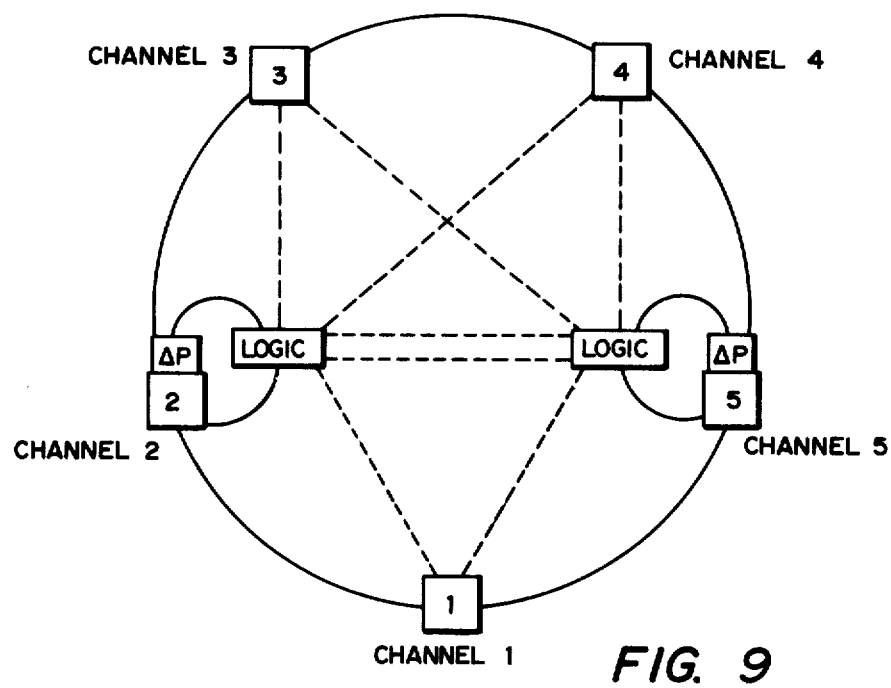
FIGS. 9 and 10 illustrate monitor and shutdown logic electronics.

The predominant oscillatory load for a two bladed helicopter has a frequency of two/rev or about 10.8 Hz for a 324 r.p.m. speed. There are also lower amplitude, but higher frequency multiples of the two/rev. The oscillatory loads make it desirable to have the on-line actuators share this load with the three active actuators. This is accomplished by utilizing a filtered $\Delta P$ feedback. This provides that the on-line actuators are very soft at low frequencies but can respond to their share of the oscillatory loads at two/rev and higher. Without $\Delta P$ feedback, the closed loop spring rate can be made to exceed $10^6$ lbs. per inch. With $\Delta P$ feedback on the redundant actuators, they may have an effective spring rate of as low as 2700 lbs./in. If one of the active actuator channels fails, then one of the on-line actuators becomes active by automatically turning off the $\Delta P$ feedback to that actuator. Thereafter, if a second active actuator channel fails, then the fifth, remaining, redundant actuatory becomes active. The system for providing $\Delta P$ feedback and for turning it off is illustrated in FIG. 9.

The system shown in the drawings described above has been called the STAR system because of the five point attachment to the swashplate. It is unique and has the potential of providing the lightest weight and lowest cost of any two fail/operate swashplate control systems. Five single piston actuators determine the plane of the swashplate and provide two fail/operate redundancy, even to the extent that two failures of the mechanical hardware as through ballistic impact can be tolerated. The system includes the use of integrated hydraulic actuated packages of the type manufactured and sold by Hydraulic Research-Textron of Valencia, California and identified as Model No. 41003640. It also employs hydraulic pumps of the type which are manufactured and sold by ABEX and identified as Model No. 40136. The alternator is of the type manufactured by Electro Kinetics Corporation, Santa Barbara, California and identified as Model No. 5167. Optical stick position sensor and fiber-optic signal transmission links preferably are employed. Each of the five horns on the swashplate are controlled by an independent signal source and driver electronics. Each integrated actuator package channel is isolated from the other four except for failure logic information that is shared between channels. For normal operations, all five integrated actuator packages share the control loads in the swashplate. However, since the system is designed to operate after any two failures, the actuators are sized so that any three actuators can react to the steady and oscillatory control loads. The invention utilizes an active on-line tracking technique to prevent control performance degradation which might result from an accumulation of small differences in gains, thresholds and linearity between the parallel control paths.

In contrast to conventional fly-by-wire approaches the STAR flight control system takes advantage of the fact that three points establish a plane. Since the spacial orientation of the fixed ring of a rotor rise/fall swashplate establishes the pitch, roll, and collective control commands, it is clear that the use of a five-horned swashplate provides for two fail/operate mechanical redundancy. By controlling each horn of the five-horned swashplate by an independent autonomous channel, a two fail/operate capability may be provided. This is the STAR system as depicted in FIG. 1. The stick pick-offs are so arranged that no mixing of signals between channels is required. The system provides the basic control function of the vehicle with no mechanical control rods, bellcranks, or other hardware associated wtih typical helicopter control systems.

The STAR system utilizes five electronic channels which control the five integrated actuator packages (IAP) 11-15 above described. They are mounted with the body assembly fixed along the perimeter of the upper transmission case. The five small hydraulic pump/electrical generator packages are driven from a drive gear 16a in the transmission top case assembly. Each pump supplies fluid to only one IAP and each generator supplies electrical power to only one electrical channel. In addition to the five drive pads, one additional drive pad is provided for mounting an auxiliary hydraulic motor/pump for use during ground check. This is accomplished by use of a sprag 16p clutch, mounted between the drive gear 16a and mast 50. This permits backdrive of gear 16a relative to the mast 50. This mechanization is depicted in FIG. 2.

Five individual stick sensors from the cyclic stick and collective stick, respectively, provide signal inputs to the electrical channels which, in turn, control the IAP's 11-15. A single two-stage servo electrohydraulic valve and a single power piston is employed in each IAP. Using actuator displacement, servo valve second-stage spool displacement, and differential pressure information, each channel provides self-monitoring and turn-off/bypass capability with a minimum of interchannel fault monitoring and equalization. Thus, FIG. 1 indicates a single channel of the STAR system.

Each of actuators 11-15 is part of an integrated actuator package which constitutes a completely self-contained hydraulic system except for the variable displacement hydraulic pumps 21-25. Each IAP is designed to operate in a Type II Class 3000 psi hydraulic system. Each IAP consists of an actuator piston and assembly, pressure and return filters, fluid reservoir, various check valves and pressure limiting valves, and an electrohydraulic control module. The control module consists of a two-stage electrohydraulic servo valve (EHSV), an electrically activated solenoid valve which controls a pressure activated bypass valve around the piston, an EHSV second-stage spool valve LVDT position sensor, and a differential pressure transducer.

FIG. 5

Figure 5:
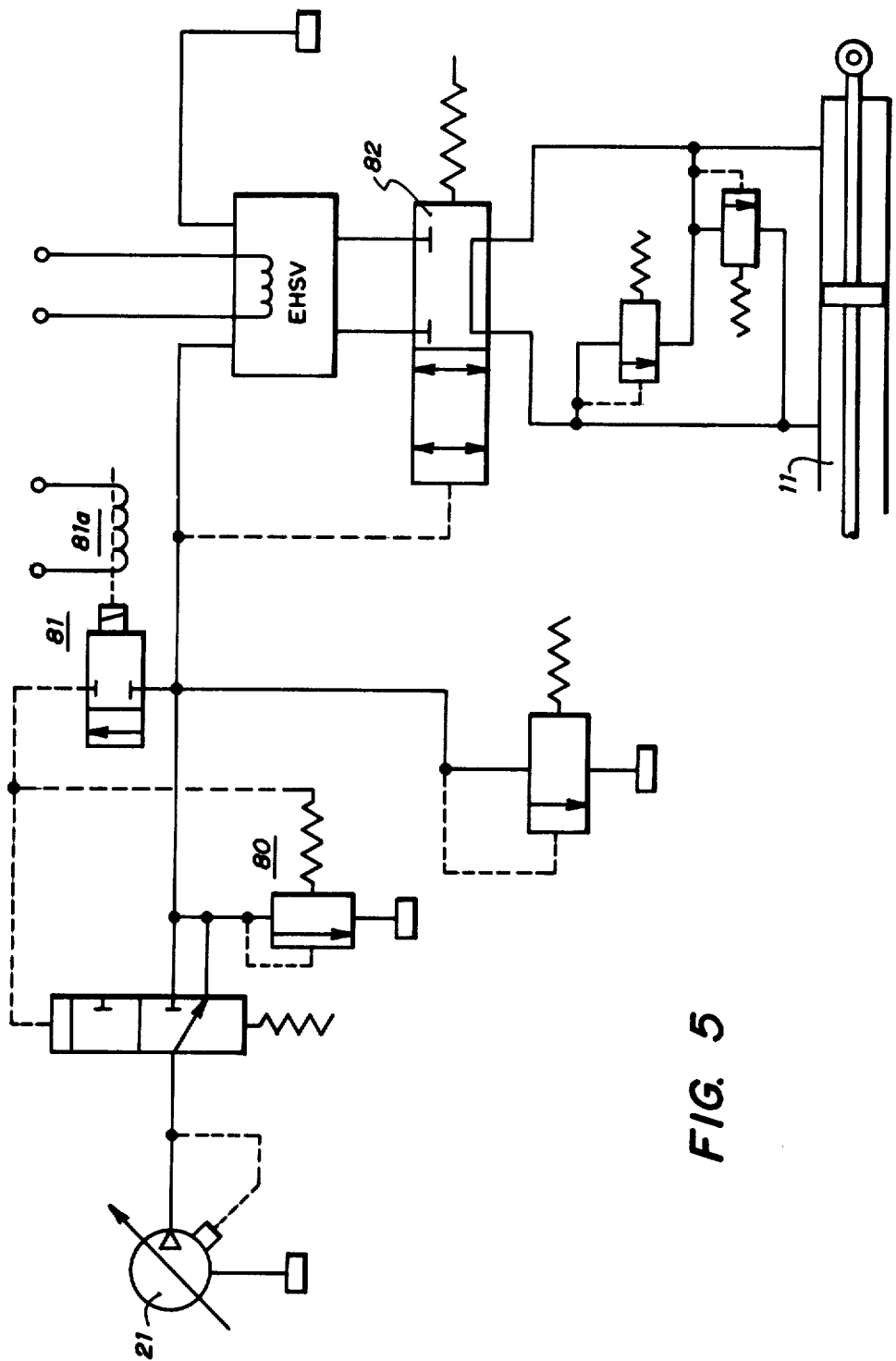
FIG. 5 is a schematic diagram of the hydraulics of each of the IAP's 11-15.

FIG. 5 depicts the hydraulic schematic of the IAP 11. A main pressure limiter valve 80 is enabled by control pressure from the solenoid valve 81. Whenever IAP 11 is disengaged by the removal of voltage from the solenoid coil 81a the piston is switched to the bypass mode, the solenoid control pressure is vented to return, ever IAP 11 is engaged, the solenoid control pressure is connected to the pressure line and limiter valve 80 is disabled so that full pump regulated pressure is sustained in the pressure circuit.

In the active mode of control solenoid valve 81 is energized porting supply pressure to the bypass shutoff valve 82 which in turn connects the electrohydraulic control parts to actuator 11. In the bypass mode, the electrohydraulic control parts are blocked by the bypass valve and the actuator control lines are interconnected to return.

The IAP servo response meets or exceeds the following:

| | |
|---|---|
| Rated Current, ma | ±8 |
| Rated velocity @ 3200# load, in/sec | 6.4 ± .64 |
| Output Stroke, in. | ±3.55 |
| Threshold (peak-to-peak), ma max. | 0.08 |
| Stall Force, lbs. min. | 4750 |
| Internal Leakage, gpm. max. | 0.25 |
| Null Bias, ma max. | 0.24 |
| Freq. Response (unloaded) | >35 Hz |
| Engage Time, sec. max. | 0.5 |
| Disengage Time, sec. max. | 0.07 |

FIG. 6

Figure 6:
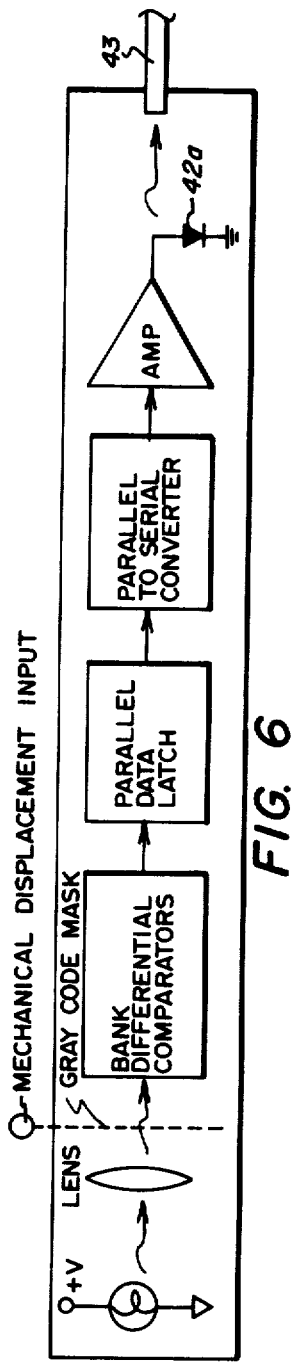
FIG. 6 illustrates an optical sensor.

Electromagnetic interference and lightning induced electromagnetic pulses are potential dangers to any fly-by-wire system. Fiber-optic materials are inherently immune to electromagnetic and electrostatic fields and offer significant advantages over regular metallic conductors for use in signal transmission. Also, position sensors which do not operate on an electromagnetic principle offer inherent advantages. An optical position encoder, FIG. 6, may be used as encoder 42, FIG. 1. Encoder 42 uses a 10-bit optical Gray code mask to encode the pilot's command into a parallel format. After performing parallel-to-serial conversion, a light emitting diode 42a is pulsed to transmit the encoded signal over a fiber optic cable 43 to the control electronics. An optical decoder in the control electronics converts the command into an analog signal to control the actuator valve driver current.

FIG. 7

Figure 7:
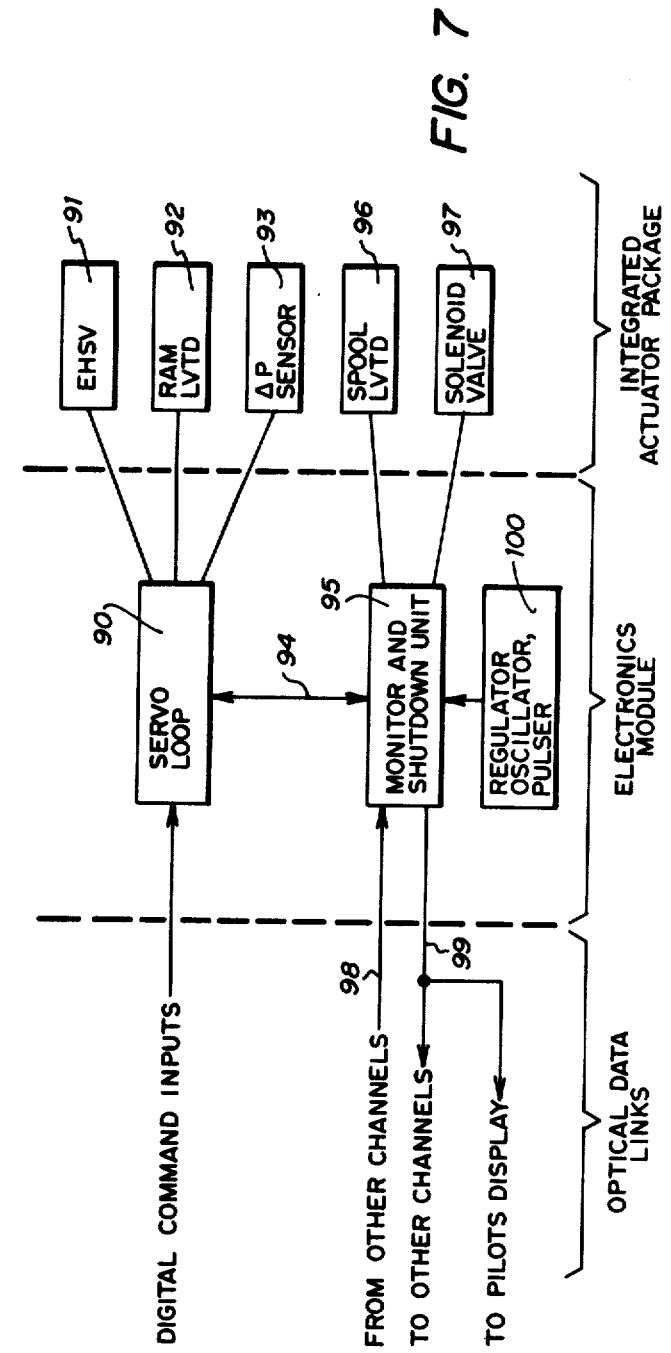
FIG. 7 illustrates an electronic system interface with IAP 11.

An electronic system interface with IAP 11 is shown in FIG. 7. FIG. 7 illustrates the generic functions of the various electronic circuits and the associated elements in IAP 11. As above-noted, the input/output data to the electronic module is digitally encoded and transferred over fiber-optic data links. Digital command inputs are applied to a servo loop unit 90 having an output going to an electrohydraulic servo valve 91. A main piston position information is provided by way of linear variable differential transformer 92. A pressure sensor 93 also feeds the servo loop 90. The output of the servo loop is connected by way of link 94 to a monitor and shutdown unit 95. A spool linear variable differential transformer 96 is connected to unit 95. Unit 95 also actuates a solenoid valve 97 in the IAP 11.

Other channels are coupled by way of linkage 98 to unit 95. Unit 95 also has a channel 99 leading to the other channels and a pilot display. A regulator, oscillator and pulsor unit 100 is connected to the unit 95.

FIG. 8

Figure 8:
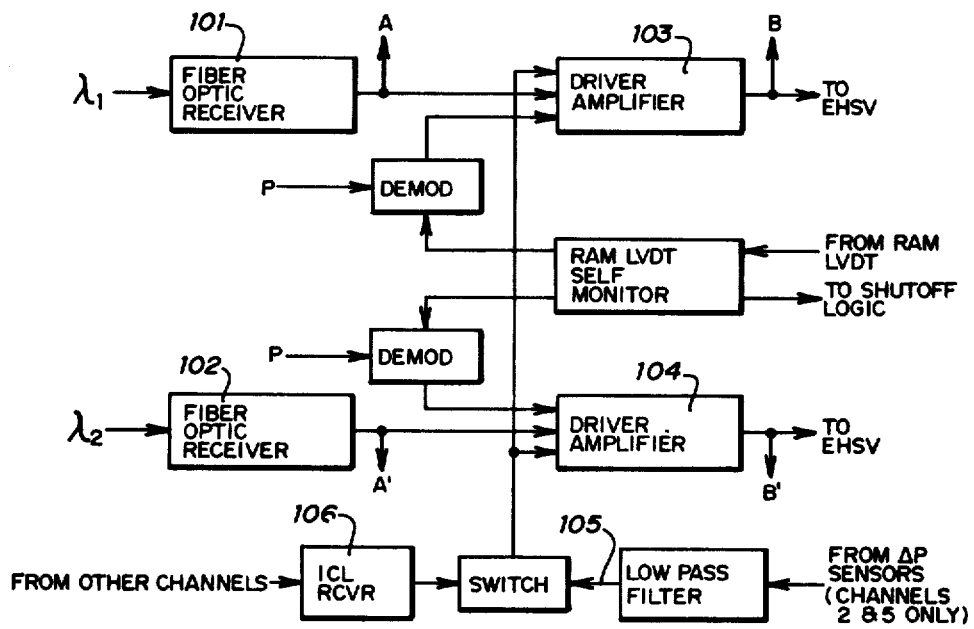
FIG. 8 illustrates servo loop electronics.

Each channel has a servo loop, depicted in FIG. 8. Position command information is decoded by two separate fiber-optic receivers 101 and 102 and is compared with actuator position information in driver amplifiers 103 and 104 to generate an electric command to the IAP 11. Various signal points are monitored to ascertain operate/failure status.

Two of the five channels are implemented with filtered ΔP feedback 105 to eliminate steady-state force fight which typically would result from channel-to-channel mistrack due to an accumulation of small differences in gains, thresholds, and linearity. By using filtered feedback, the actuators 111-115 are not prevented from responding to two/rev load nor rapid control input commands. Interchannel logic (ICL) 106 has signals controlling this feedback path which are transferred via optical links and are shown in FIGS. 9 and 10.

Figure 10:
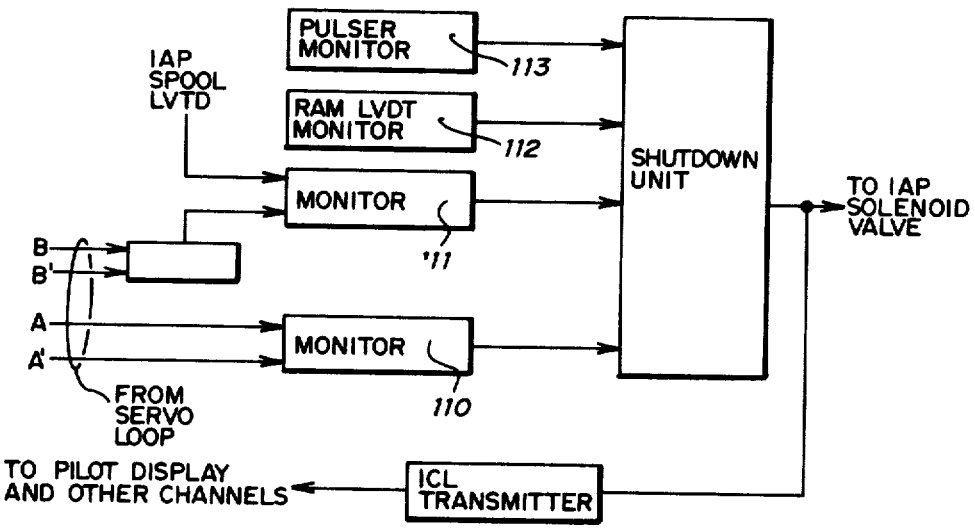

FIGS. 9 and 10

The STAR flight control system provides excellent reliability and survivability to ballistic damage.

Each channel is implemented with self-monitor capability to detect possible channel failure conditions. If a failure is detected, shutdown logic circuitry enables the actuator to be switched into a bypass mode and a status signal to be sent to the cockpit display area and to the other channels as shown in FIG. 10.

The self-monitor capability is provided by the use of four different monitor circuits. The first monitor 110 comprises the output from dual fiber-optic receivers to detect stick sensor failure and/or fiber-optic link failure. The second monitor 111 comprises the output of a servo valve model with the output from the servo valve second stage spool LVDT to detect hydraulic system failures. The third monitor 112 provides a self-check of the actuator piston position LVDT. The fourth monitor 113 provides a self-check of the pulser circuit which enables the demodulation of the various LVDT sensor outputs.

FIG. 11

Figure 11:
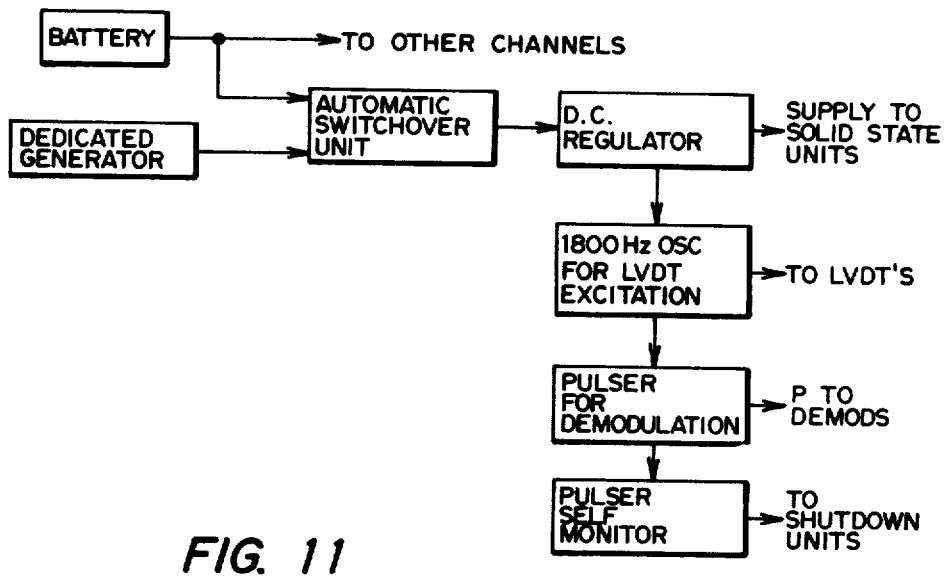
FIG. 11 illustrates electrical supply and regulation units.

Each channel receives electrical power from a dedicated generator once rotor speed exceeds 90 percent of idle speed. Automatic switch-over electronics isolates each channel from the ship's battery used for start-up. Solid state regulation is utilized to derive 15 VDC and 7.5 VDC supply voltages for powering the various solid state components position sensors. A block diagram of the configuration is shown in FIG. 11.

No mechanical connection exists between the control sticks and the rotor. Thus there is no correlation between stick position and rotor position when the control system is unpowered. Gravitational forces will cause the swashplate and rotor pitch horns to droop into some particular position. Upon start-up, it is important to gain electrohydraulic control as quickly as possible before the rotor has moved very far and/or gained much speed.

Control management during start-up can be described as follows: Electrical power is provided to the electronic control modules. Once electrical system checks O.K., engine start-up is initiated. A hardover electrical command to the electrohydraulic servo valve is generated due to the fact that position of actuators does not agree with the position of the stick. As rotor RPM increases, the hydraulic pumps have the capability to supply some pressure and some flow; thus, the actuator begins to respond to the servo valve hardover command. The actuator piston is slaved into a position which agrees with the command stick position. At this point the flow requirement is satisfied and pressure builds up rapidly, holding the rotor in flat-track for the remaining time necessary to build up to full RPM.

Test data indicate that within seven seconds the rotor position is synchronized to the control command. By this time, the rotor will have made 1½ revolutions and rotor speed will be 25 RPM.

We claim:

1. In a helicopter having a rotor driving mast which in turn is driven by a transmission and wherein a swashplate is individually linked to pitch horns on each rotor blade with at least four actuators coupled to said swashplate, three of which normally control the attitude and position of said swashplate, the combination comprising:
  (a) a separate power unit for each said actuator, each power unit being independently driven from said transmission; and
  (b) means to shift control of said swashplate from one of said three actuators to a fourth actuator upon said one becoming disabled.

2. In a helicopter having a rotor driving mast which in turn is driven by a transmission and wherein a swashplate is individually linked to pitch horns on each rotor blade with at least four actuators coupled to said swashplate, any three of which may control the attitude and position of said swashplate and where a separate power unit is provided for each said actuator, each power unit being independently driven by said transmission; the combination which comprises means to shift control of said swashplate from one of said three actuators to a fourth actuator upon said one becoming disabled.

3. The system of claim 2 wherein a separate pilot input sensor is provided for control of each said activator.

4. The system of claim 3 wherein a separate cyclic stick sensor and a separate collective stick sensor are provided for each said actuator.

5. The system of claim 4 wherein each said sensor is powered from the same power unit that is associated with the actuator which is responsive to said sensor.

6. The system of claim 3 wherein light pipes form the signal path between each said sensor and one of said actuators.

7. In a helicopter having a rotor driving mast which in turn is driven by a transmission and wherein a swashplate is individually linked to pitch horns on each rotor blade with at least four actuators coupled to said swashplate, three of which normally control the attitude and position of said swashplate, the combination comprising:
  (a) a separate power unit for each said actuator, each power unit being independently driven from said transmission; and
  (b) separate pilot input sensor means for control of each said actuator, each given sensor means being energized from the same power unit that powers the actuator responsive to said given sensor means.

8. The system of claim 7 wherein a separate cyclic stick sensor and a separate collective stick sensor are provided for each said actuator.

9. The system of claim 8 wherein light pipes form the signal path between each said sensor and one of said actuators.

10. In a helicopter having a rotor driving mast which in turn is driven by a transmission and wherein a swashplate is individually linked to pitch horns on each rotor blade with at least four actuators coupled to said swashplate, three of which normally control the attitude and position of said swashplate, the combination comprising:
  (a) a separate power unit for each said actuator, each power unit being independently driven from said transmission;
  (b) a separate command sensor means each connected to control one of said actuators and each having positional orientation related to the positional orientation of the actuator it controls; and
  (c) energizing circuits, one leading from each said power unit to a given sensor and to an actuator controlled by said given sensor.

11. The system of claim 10 wherein a separate cyclic stick sensor and a separate collective stick sensor are provided for each said actuator.

12. The system of claim 11 wherein light pipes form the signal path between each said sensor and one of said actuators.

* * * * *